May 11, 1965 R. BRANDT ETAL 3,183,352
CORONA TREATING OF SHAPED ARTICLES
Filed Nov. 23, 1960

INVENTORS
ROGER BRANDT
CHARLES HILL HARTFORD
BY
ATTORNEYS

United States Patent Office 3,183,352
Patented May 11, 1965

3,183,352
CORONA TREATING OF SHAPED ARTICLES
Roger Brandt, Andover, and Charles Hill Hartford, Maynard, Mass., assignors to American Can Company, New York, N.Y., a corporation of New York
Filed Nov. 23, 1960, Ser. No. 71,241
7 Claims. (Cl. 250—49.5)

This invention relates to corona treating of shaped articles and particularly articles of irregular shaped surface areas and made of synthetic resinous material such as polyethylene.

It has been known to corona treat synthetic resinous films or articles by approaching their opposite faces with electrodes and impressing a suitable high frequency, high value electrical voltage across the gap between the electrodes. Heretofore this process has been carried out on regularly shaped surfaces such as film, cylindrical tubes, and the like, but prior to the present invention no practical way has been devised for treating irregular surfaces, or bodies where access to one of the surfaces is impaired by a restricted neck portion. In particular, difficulty has been experienced in attempting to treat blown bottles of synthetic resin with corona discharge.

One of the objects of the invention is to provide apparatus for corona discharge treating at least one of two opposing surface areas of shaped articles.

Another object of the invention is to provide apparatus for corona discharge treating a surface of a shaped article in which at least one of the electrodes is flexible to instantaneously conform to the shape of the surface of the article placed in contiguity therewith.

A further object of the invention is to provide an apparatus for corona treating bottles, containers, hollow and tubular objects or the like of various sizes and shapes, especially those having a restricted neck opening.

A further object of the invention is to corona discharge treat an article by positioning flexible electrodes in contiguity with opposing surfaces of the articles and energizing those electrodes while the article is moved therebetween.

Numerous other objects and advantages of the invention will be apparent as it is better understood from the following description, which, taken in connection with the accompanying drawings discloses a preferred embodiment thereof.

Figure 1:
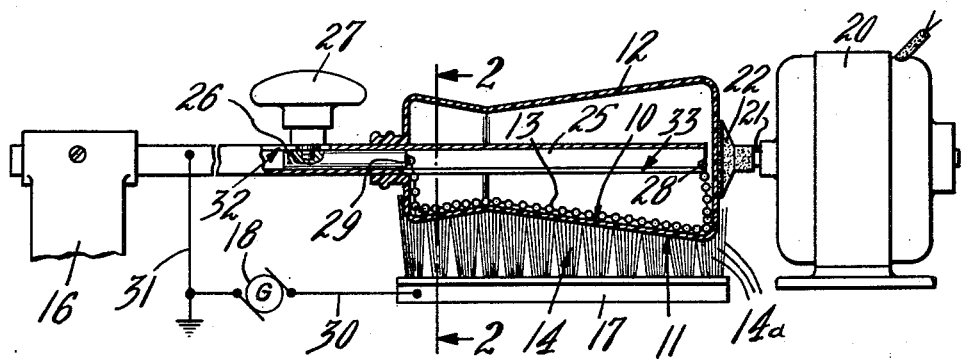
Figure 2:
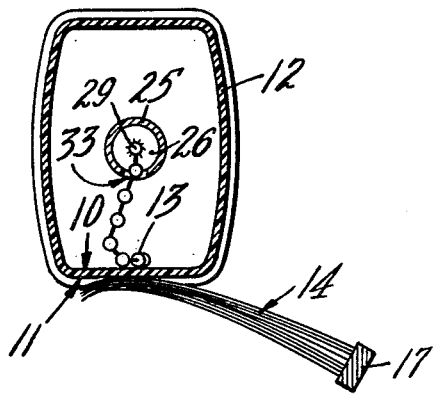

FIGURE 1 is an elevation, partly in section, of an apparatus designed to carry out the invention; and FIG. 2 is a section taken approximately on the line 2—2 of FIG. 1.

Illustrated in FIG. 1 is an apparatus for corona discharge treating at least one of two opposing surface areas 10 and 11 of a shaped article 12, in this instance a bottle. The apparatus includes an inner electrode 13 and an outer electrode 14 arranged to flexibly conform to the shape of the inner and outer surfaces 10 and 11 respectively as they are placed in contiguity therewith. In addition, the electrodes 13 and 14 are capable of instantly changing upon instantaneous change of the shape of the surface of the article 12 so as to always be in contiguity with a surface area thereof. As illustrated, the inner electrode 13 is a ball chain and the outer electrode 14 is an energy conductive bristle brush having a plurality of flexible bristles 14a directed in an upwardly direction having a vertical component towards electrode 13.

The inner and outer electrodes 13 and 14 are supported proximate each other by suitable supporting structures 16 and 17 respectively. Corona discharge is obtained from an energy source 18 operatively associated with electrodes 13 and 14. Energy source 18 supplies a high frequency, high voltage electrical potential drop across the gap between the electrodes 13 and 14 and in corona discharge treating association with at least one of the opposing surface areas 10 and 11 of the article 12.

Since the treating effect of corona discharge on a resin surface is known to occur only where the electrode is slightly out of contact with the surface, it will be noted that the flexible electrodes are arranged to have discontinuous contact with the surface with only minute local contact areas so that there will be a fairly general and uniform coverage of areas which are spaced slightly from the electrode surfaces and which will hence be in a position to receive effective corona discharge treatment.

In further carrying out the invention, the article 12 is supported so as to be movable relative to the electrodes 13 and 14. Shaped article 12 is easily supported and moved by any article mover device 20, for example, an electrical motor having a shaft 21 provided with suction cup 22 to engage and thereby support article 12, so that the surface of the area to be treated traverses at least one of the electrodes.

As previously mentioned the inner electrode 13 is a ball chain which may intimately engage a surface of any shape with which it is brought into engagement and will move along such surface if it is progressed transversely thereof. Electrode 13 is conveniently and easily supported by support 16 by providing support 16 with an arm 25, preferably a hollow tube, extendable into article 12 and slidably supporting within itself a slide 26 provided with a clamping handle 27 extending through a slot 32 in the tubular arm 25. One end 28 of the ball chain is secured to the end of arm 25 and the other end 29 of the ball chain or inner electrode 13 is secured to slide 26. The arm 25 also has an elongate slot 33 into which the electrode can be retracted. Movement of slide 26 in one direction along arm 25 straightens electrode 13 and pulls it upwardly away from electrode 14 and into slot 33 or into the interior of tube 25 whereas movement of slide 26 in the opposite direction along arm 25 moves end 29 toward end 28 and allows electrode 13 to hang downwardly through slot 33 towards electrode 14 and closely engage surface area 10 vertically over bristles 14a. Handle 27 may be in the form of a set screw threaded into slide 26 and tightenable against arm 25 to lock slide 26 in a desired position in arm 25.

In carrying out the method and in using the present apparatus the operator first sees that slide 26 is to the left in FIG. 1 so that electrode 13 is drawn tight and extends generally parallel with arm 25 for ready insertion into the neck of the article 12. In this position the electrodes are separated and tend to prevent corona discharge. The next operation is to place article 12 over arm 25 and on suction cup 22 with surface area 11 contiguous with the bristles 14a of outer electrode 14 so that the bristles are flexed thereagainst and thereby conform to the face of the surface of the article 12. Following this operation slide 26 is moved to the right in FIG. 1 so as to move end 29 towards end 28 and allow the intermediate or center portion of inner electrode 13 to flexibly and conformably rest on or at least be contiguous to the surface area 10 and in close enough association with surface area 10 and outer electrode 14 to favor corona discharge. Energy from source 18 causes corona discharge at the electrodes 13 and 14 to treat the surfaces 10 and 11. In the schematic illustration of FIG. 1 the energy from source 18 may be in the form of a high value, high frequency alternating electrical voltage conducted through a wire 31 from one side of the source 18 to the rod 25 which in turn is secured to end 28 of the inner electrode chain 13 and conducted from the other side of source 18 through a wire 30 and the support 17 to the bristles 14a of the brush 14.

Thereafter the article mover 20 moves the surface area to be treated transversely of and across or between the brushes or electrodes to corona discharge treat the surface area. If the entire tubular surface area of the tubular article or bottle 12 is to be treated the bottle may be rotated by motor 20. The flexible electrodes continuously flex and conform, at all times during treatment, to the shape of the bottle surface presented thereto.

It is thought that the invention and many of its attendant advantages will be understood from the foregoing description and it will be apparent that various changes may be made in the form, construction, and arrangement of parts of the apparatus mentioned herein and in the steps and their order of accomplishment of the process described herein, without departing from the spirit and scope of the invention or sacrificing all of its material advantages, the apparatus and process hereinbefore described being merely a preferred embodiment thereof.

We claim:

1. Apparatus for corona discharge treating at least one of two opposing surface areas of shaped articles comprising, a first electrode presenting flexible first means conformable to the shape of the first surface of an article placed in contiguity therewith and capable of instantly changing upon instantaneous change of the shape of said first surface, said first means comprising flexibly connected, conductive elements providing a multiplicity of minute local contact areas with said first surface, a second electrode presenting second means conformed to the shape of the opposite surface of an article placed in contiguity therewith, structure supporting said first and second electrodes proximate each other with the first and second means simultaneously contiguous with the respective of the opposing surface areas of a shaped article positioned therebetween, and an energy source associated with said electrodes to form corona discharge at at least one of said means in corona discharge treating association with at least one of said opposing surface areas of the article.

2. The apparatus as defined in claim 1 additionally including article moving means moving said article relative to at least one of said means while the article is in corona discharge treating association therewith so as to corona discharge treat at least one of said opposing surfaces as the article traverses said at least one of said means.

3. The apparatus as defined in claim 1 additionally including electrode moving means to move one of said means away from the other means to tend to prevent corona discharge and also to move said one of said means towards the other of said means to thereby favor corona discharge.

4. The apparatus as defined in claim 1 additionally including one of said flexible means comprising a flexible brush of conductive bristles arranged with the bristles flexed against and thereby conformable to the shape of the surface of an article placed in contiguity therewith.

5. The apparatus as defined in claim 1 wherein said flexibly connected elements comprise a flexible chain of small, closely spaced conductive balls, said chain being suspended at its opposite ends and arranged between said ends to rest on and thereby conform to the shape of said first surface.

6. An apparatus for corona discharge treating at least one of two opposing surface areas of shaped articles comprising an energy conductive flexible brush of conductive bristles arranged with the bristles thereof conformable to the shape of the surface of an article placed in contiguity therewith and capable of instantly changing upon instantaneous change of the shape of the surface of the article placed in contiguity therewith, an energy conductive flexible chain suspended at the ends thereof and arranged with the intermediate portion thereof restable on and thereby conformable to the shape of the surface of an article placed in contiguity therewith and capable of instantly changing upon instantaneous change of the shape of the surface of the article placed in contiguity therewith, supporting structure supporting said flexible brush with the bristles thereof directed in a direction having a vertical component and supporting said chain with the intermediate portion thereof vertically over the bristles, said structure supporting said brush and chain proximate each other with the brush and chain simultaneously contiguous with the respective of the opposing surface areas of a shaped article positioned therewith, and an energy source associated with said brush and chain to form corona discharge in corona discharging treating association with at least one of said opposing surface areas of said article.

7. Apparatus for corona discharge treating at least one of the interior and exterior surfaces of a shaped thermoplastic container, comprising a first electrode including a flexible chain suspended at the ends thereof and arranged with the intermediate portion thereof capable of resting on and thereby conforming to one of said container surfaces placed in contiguity therewith, a second electrode presenting a means conformed to the shape of the other of said container surfaces, structure supporting said first and second electrodes proximate each other with the respective surfaces of said container positioned therebetween, said supporting structure for said first electrode including two members movable in opposite directions relative to each other, one of said members holding one end of said chain and the other member holding the other end of said chain, said members upon relative movement in one of said opposite directions straightening said chain and thereby moving the intermediate portion thereof away from said one surface and upon relative movement in the other of said opposite direction relaxing said chain thereby effecting movement of the intermediate portion thereof towards said one surface, and an energy source associated with said electrodes to form corona discharge therebetween to treat at least one of said surfaces of said container.

References Cited by the Examiner

UNITED STATES PATENTS

| 2,357,809 | 9/44 | Carlson | 250—49.5 |
| 2,876,358 | 3/59 | Root | 250—49.5 |
| 2,879,396 | 3/59 | McDonald | 250—49.5 |
| 3,021,270 | 2/62 | Torbox et al. | 204—168 |

RALPH G. NILSON, *Primary Examiner.*